May 22, 1934. W. L. BEEBE 1,959,896
GAUGED DOSE TUBE
Filed June 18, 1931
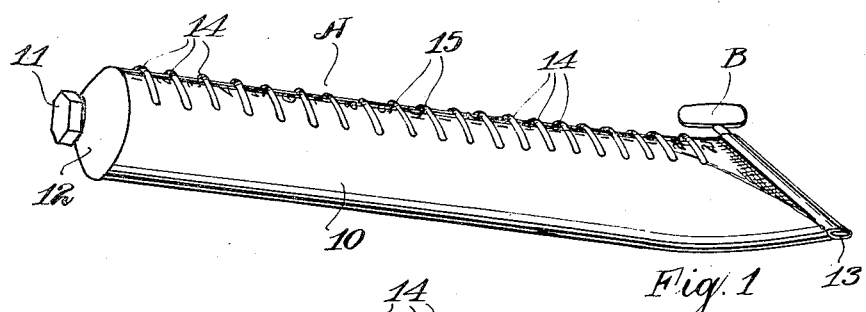
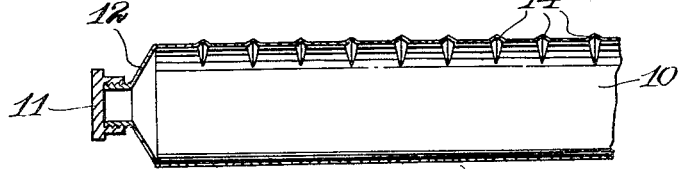
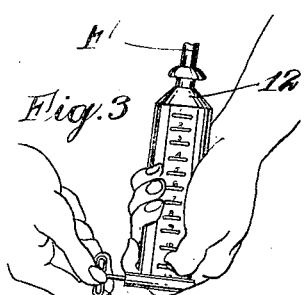
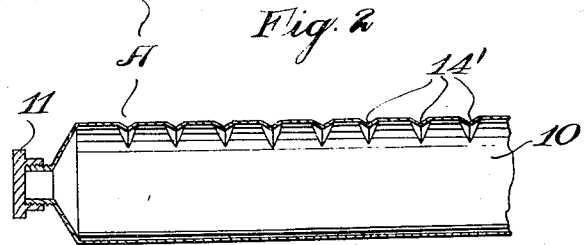
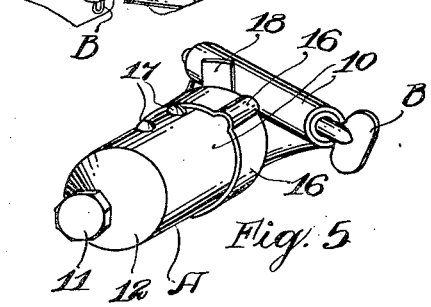
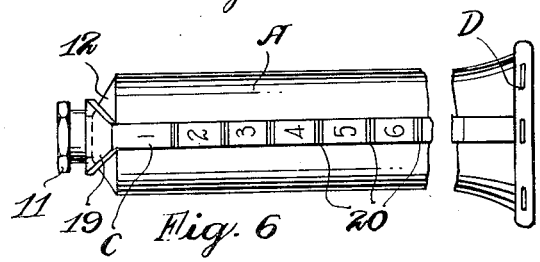
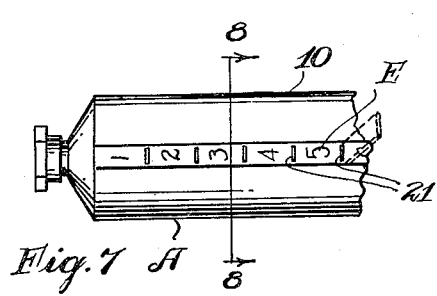
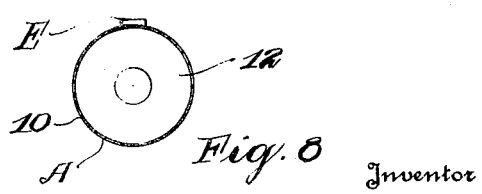
Inventor
Ward L. Beebe
By
Attorney Patented May 22, 1934

1,959,896

UNITED STATES PATENT OFFICE 1,959,896

GAUGED DOSE TUBE

Ward L. Beebe, St. Paul, Minn.

Application June 18, 1931, Serial No. 545,215

11 Claims. (Cl. 128—230)

My invention relates to a gauged dose tube where it is desired to provide a collapsible tube with a gauge so that a certain dose may be readily ejected out of the tube when it is desired. In providing this gauged tube to indicate each dose, the operator may use the same without waste and readily eject a dose at a time out of the same, rather than not knowing just how much has been ejected from the tube in using the same. This is very important in carrying out the principles of my gauged tube and in providing a dispenser of the character as will be more fully hereinafter set forth.

With this gauged dose tube I provide a means of dispensing doses of material carried in the tube with a pre-determined accuracy as to each dose. The tube may be provided with a gauged portion so that the operator's finger nail may act as a stop in collapsing the tube for each dose. By placing a key member on the lower end of the tube, the tube may be rolled up as it is collapsed on the key to flatten the tube in the process of ejecting a dose at a time.

This gauged dose tube accomplishes the means of providing a dispenser for dispensing a jelly-like substance such as vaseline, or any suitable remedy of a character to be contained within a collapsible tube of this nature. This gauged tube provides a ready means for dispensing a dry, jelly or cream-like medicated treatment or pile remedy, such as are used for rectal treatments where it is difficult for the user to be able to gauge the amount of each dose. With this gauged tube, each dose may be virtually accurately dispensed, thereby not only saving the material, but also affording a means of accurately pre-determining the doses from the collapsible tube.

My gauged dose tube may be made up in a manner where the doses are indicated in gauge marks along the tube which either project or are depressed in the form of a bead or groove, respectively, or the same may be provided with a gauged strip carried along the side of the tube which can be marked with the proper gauge marks to indicate each dose, and this strip may collapse with the tube or it may be bent up and broken as the tube is collapsed, to indicate each dose. I also provide a means of indicating the doses by a band-like stop member which is adjustable into different positions along the tube in the course of dispensing the contents of the same.

In the drawing forming part of this specification:

Figure 1 illustrates a perspective view of a form of my gauged dose tube.

Figure 2 is a detail section of the same, a part of which is broken away.

Figure 3 is a perspective illustrating the manner of using my gauged dose tube.

Figure 4 is a sectional detail of another form of the gauged dose tube.

Figure 5 illustrates a perspective of still another form of my gauged dose tube.

Figure 6 illustrates a different form of applying the gauge marks.

Figure 7 is another form of applying the gauge marks to the tube.

Figure 8 is a section on the line 8—8 of Figure 7.

My gauged dose tube A is made of the material which is ordinarily used in collapsible tubes and is provided with a body portion 10 having a collapsible nature so that the same may be collapsed upon a key B.

The tube A is provided with a cap 11 which screws onto the top portion 12 to close the tube. The tube A may be made of any suitable material and is of any design or shape so as to form a means of holding a cream or material of a jelly-like nature, such as vaseline, or other similar material, which may be made up as a medicine or treatment and which is desired to be dispensed in doses from the tube A.

The wall 10 of the tube A may be formed with a series of projecting ribs 14 along the tube A which indicate the respective doses in the tube. The distance between each rib 14 would thus indicate one dose. Indicia such as 15 may be printed upon the wall 10 of the tube between or adjacent the gauge ribs 14 so as to indicate the respective doses in the tube A.

The form of the gauged dose tube A illustrated in Figures 1, 2 and 3, is of the simplest nature, where the ribs 14 are formed in the tube wall before the lower end 13 of the tube A is clamped closed, or these gauge marks may be formed by depressions 14' in the wall 10 so as to indicate each dose along the wall of the tube.

I have also illustrated a form of the dispensing tube A in Figure 5, which shows a spring band 16 extending around the wall 10 of the tube A and which is formed with an upstanding channel portion 16 adapted to be positioned to slide over the knobs 17 formed projecting from the wall 10 of the tube A in this structure. This adjustable spring band 16 is also formed with a shoulder lip 18. The spring band 16 is adapted to be positioned on the tube A in the desired position between the knobs 17, as illustrated in Figure 5, and then the key B is turned so as to collapse the wall of the tube up to the shoulder 18, in this manner regulating each dose dispensed from this form of the tube A.

In Figure 6 I have illustrated the tube A with a gauged strip such as C extending along the side wall of the tube. This strip is formed with a collar portion 19 which slips over the neck of the end 12 beneath the cap 11, while the other end of the strip C is anchored to the side of the tube A by the closing clip D at the bottom of the tube A. The gauged strip C is formed with suitable gauge marks 20 similar to the gauge ribs 14 or 14'. Thus this construction of my tube A provides a means of indicating each dose to be dispensed from the tube A.

In Figures 7 and 8 I have illustrated another form of a gauge strip, such as E, which is provided with suitable gauge marks 21 along the same to indicate each dose. In this form of the dispensing tube A, the gauge strip E may be secured in any suitable manner to the side wall 10 of the tube A. This provides a simple gauge strip along the side of the tube A which may be adhered or secured to the wall in a desirable manner and the gauge marks 21 constitute open slots in the gauge strip E so that the portion between each mark may be bent up, as indicated in dotted outline in Figure 7, starting from the bottom as the tube A is collapsed in this form, and then broken off, after the tube is collapsed up to that point of the mark, so that the bent-up portion may act as a shoulder or stop in the collapsing of the tube and then the bent up portion may be broken off.

It is not necessary to employ the projecting lip 18 as the channel portion 16 may act as a shoulder if it is desired, or the edge of the band 16 provides a sufficient shoulder to stop the collapsing operation of the key B.

In using my dispensing gauged dose tube A, I have indicated the manner in which it may be held by the user in Figure 3 to show how the thumb nail may be placed at one of the gauge marks, while the key B is engaged in the other hand to operate the collapsing movement of the tube A to dispense the desired dose. In this figure I have partially shown a dispensing tube F attached to the neck of the tube A in place of the cap 11.

This provides a very desirable means of dispensing a cream or jelly-like substance contained in the tube A and permits the user to virtually accurately dispense a dose at a time out of the tube. Heretofore it has been difficult to accomplish this and in certain treatments or uses it will be apparent that this form of dispensing device is a very desirable means of accurately gauging a dose at a time from the tube.

In accordance with the patent statutes I have endeavored to set forth the best embodiment of my gauged dose tube and while the illustrations show several forms, they are all of the same character and have the same function to operate in a manner to dispense a dose at a time from the tube A, and I desire to have it understood that the illustrations are only suggestive of a means of carrying out the principles and purpose of the invention and that variations may be made within the scope of the following claims.

I claim:

1. A collapsible gauged dose tube including, a body portion having a collapsible wall, and a series of gauged doses indicated along the wall in a manner to permit the user of said tube to accurately dispense a dose at a time therefrom by collapsing the tube toward said gauged dose indications.

2. A dose tube for medical treatments adapted to contain the same sealed within said tube, and gauge means extending along said tube to indicate each dose to be dispensed therefrom and means for collapsing said tube toward said gauge means.

3. A dispensing container including, a collapsible body, a tubular carrying member extending from said body, a key for collapsing said body by rotating the same to roll said body onto said key, and gauge means for indicating individual doses and adapted to act as a stop gauge between each dose for the operation of said key.

4. A dispenser for pile salves including, a collapsible tubular container, means for collapsing said container, and gauge means for indicating each dose in the collapsing of said container toward which said tube is collapsed.

5. A dispenser for a cream of a jelly-like nature including, a collapsible tube member, a tubular carrier extending from said tube member, indicating means along said container to provide a gauged means for regulating each dose dispensed from said tube, and key means for collapsing said container toward said gauged means to dispense a dose at a time as indicated by said gauge means.

6. A collapsible dispenser including, a tubular body portion, a key for collapsing said body portion, and a series of transversely disposed spaced rib-like members formed in the wall of said tubular member adapted to provide gauge shoulders for stopping said key and indicating a dose at a time to be dispensed.

7. A dispenser for medicated creams and jellies including, a collapsible tubular member, a key for collapsing said tubular member, and gauged shoulder means extending along said tubular member to retard said key in the collapsing of said tubular member to dispense a dose at a time.

8. A collapsible dispenser for creams and jelly-like substances including, a collapsible tubular body portion, a key for collapsing said body portion, a series of knobs projecting along said body portion, an adjustable spring band having means to be adjusted between said knobs and including a shoulder portion projecting therefrom, said band adapted to act as a stop shoulder in the operation of said collapsing key.

9. A collapsible dispenser including, a tubular body portion, a tube receiving end formed on said body, a flattened end formed on the other end of said body, a key for engaging said flattened end to collapse said body by rolling the same on said key, and shoulder means having gauged portions to act as a shoulder to stop the collapsing operation of said key in a manner to dispense a dose at a time out of said container.

10. A collapsible tube dispenser and a gauge member extending along said tubular member having gauge marks to indicate a dose to be dispensed from said collapsible tube dispenser, said gauge member having a nature to be bent up to form a shoulder to indicate a dose to be dispensed from said tube, and broken off at the last gauge mark after each dose has been dispensed.

11. A collapsible dispensing tubular container including, a collapsible body portion, and a gauged member having a series of doses indicated along the same, said gauged member having a nature whereby a portion thereof can be broken off between each gauge indication after the dose indicated by the portion broken off has been dispensed from said container.

WARD L. BEEBE.